United States Patent
Yamaguchi (10) Patent No.: US 12,249,172 B2
(45) Date of Patent: Mar. 11, 2025

(54) INFORMATION PROCESSING APPARATUS, NON-TRANSITORY COMPUTER READABLE MEDIUM STORING PROGRAM, AND INFORMATION PROCESSING METHOD

(71) Applicant: FUJIFILM Business Innovation Corp., Tokyo (JP)

(72) Inventor: Masayuki Yamaguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 516 days.

(21) Appl. No.: 17/485,538

(22) Filed: Sep. 27, 2021

(65) Prior Publication Data

US 2022/0383023 A1    Dec. 1, 2022

(30) Foreign Application Priority Data

May 26, 2021    (JP) ................................ 2021-088281

(51) Int. Cl.
| | | |
|---|---|---|
| *G06V 30/418* | (2022.01) | |
| *G06F 40/166* | (2020.01) | |
| *G06V 30/412* | (2022.01) | |
| *G06V 30/10* | (2022.01) | |

(52) U.S. Cl.
CPC .......... *G06V 30/418* (2022.01); *G06F 40/166* (2020.01); *G06V 30/412* (2022.01); *G06V 30/10* (2022.01)

(58) Field of Classification Search
CPC .... G06V 30/418; G06V 30/412; G06V 30/10; G06F 40/166; G06F 16/383
See application file for complete search history.

(56) References Cited

U.S. PATENT DOCUMENTS

| | | | |
|---|---|---|---|
| 2016/0227066 | A1 | 8/2016 | Shimazaki |
| 2017/0124413 | A1* | 5/2017 | Deng ................... G06V 30/153 |
| 2018/0082154 | A1* | 3/2018 | Kalyuzhny .......... G06F 18/2178 |

FOREIGN PATENT DOCUMENTS

| | | |
|---|---|---|
| JP | 2000105796 | 4/2000 |
| JP | 2021077332 | 5/2021 |

OTHER PUBLICATIONS

"Search Report of Europe Counterpart Application", issued on Apr. 26, 2022, p. 1-p. 7.
"Office Action of Europe Counterpart Application", issued on Jun. 25, 2024, p. 1-p. 5.
"Notice of Reasons for Refusal of Japan Counterpart Application", issued on Jan. 7, 2025, with English translation thereof, p. 1-p. 5.

* cited by examiner

*Primary Examiner* — John R Wallace
(74) *Attorney, Agent, or Firm* — JCIPRNET (57) ABSTRACT

An information processing apparatus includes a processor configured to acquire a text recognition result including a text string included in an image and position information of the text string in the image, display the text string included in the text recognition result, and specify, in a case where the displayed text string is corrected, position information corresponding to the corrected text string, among pieces of the position information associated with each text string included in the text recognition result.

19 Claims, 8 Drawing Sheets

| POSITION INFORMATION | TEXT STRING |
|---|---|
| p01 | INVOICE |
| p02 | DATE |
| p03 | ISSUE DATE |
| p04 | 10/01/2018 |
| p05 | NUMBER |
| p06 | INVOICE NUMBER |
| p07 | LI-K12554 |
| p08 | ... |
| p09 | ... |
| ... | ... |
| ... | ... |
| ... | ... |

| POSITION INFORMATION | TEXT STRING |
|---|---|
| p01 | INVOICE |
| p02 | DATE |
| p03 | ISSUE DATE |
| p04 | 10/01/2018 |
| p05 | NUMBER |
| p06 | INVOICE NUMBER |
| p07 | LI-K12554 |
| p08 | ... |
| p09 | ... |
| ... | ... |
| ... | ... |
| ... | ... |

FIG. 6

| key | POSITION OF value CORRESPONDING TO Key |
|---|---|
| TITLE | TOP |
| DATE | RIGHT SIDE OF key |
| NUMBER | RIGHT SIDE OF key |
| ... | ... |
| ... | ... |
| ... | ... |
| ... | ... |

FIG. 7

| key | value | POSITION INFORMATION OF value |
|---|---|---|
| TITLE | INVOICE | p01 |
| DATE | ISSUE DATE | p03 |
| NUMBER | INVOICE NUMBER | p06 |
| ... | ... | ... |
| ... | ... | ... |
| ... | ... | ... |
| ... | ... | ... |

| key | value | POSITION INFORMATION OF value |
|---|---|---|
| TITLE | INVOICE | p01 |
| DATE | 10/01/2018 | p04 |
| NUMBER | INVOICE NUMBER | p06 |
| ... | ... | ... |
| ... | ... | ... |
| ... | ... | ... |
| ... | ... | ... |

FIG. 11

| key | IMAGE | value |
|---|---|---|
| 1 TITLE | INVOICE | INVOICE |
| 2 DATE | 10/01/2018 | 10/01/2018 |
| 3 NUMBER | INVOICE NUMBER | INVOICE NUMBER |
| 4 ...... | ...... | ...... |

FIG. 12

| key | value | POSITION INFORMATION OF value |
|---|---|---|
| TITLE | INVOICE | p01 |
| DATE | 10/01/2018 | p04 |
| NUMBER | LI-K12554 | p07 |
| ... | ... | ... |
| ... | ... | ... |
| ... | ... | ... |
| ... | ... | ... |

FIG. 13

| key | IMAGE | value |
|---|---|---|
| 1 TITLE | INVOICE | INVOICE |
| 2 DATE | 10/01/2018 | 10/01/2018 |
| 3 NUMBER | LI-K12554 | LI-K12554 |
| 4 ...... | ...... | ...... |

INFORMATION PROCESSING APPARATUS, NON-TRANSITORY COMPUTER READABLE MEDIUM STORING PROGRAM, AND INFORMATION PROCESSING METHOD

CROSS-REFERENCE TO RELATED APPLICATIONS

This application is based on and claims priority under 35 USC 119 from Japanese Patent Application No. 2021-088281 filed May 26, 2021.

BACKGROUND

(i) Technical Field

The present invention relates to an information processing apparatus, a non-transitory computer readable medium storing a program, and an information processing method.

(ii) Related Art

JP2000-105796A discloses a method of creating, based on a reading result of a document, an intermediate file including a text code, error information indicating a text position at which a reading error occurs, and image information of the entire document, detecting a field to which a text with an error belongs based on the error information included in the intermediate file, cutting out an image of the field from the image information of the entire document, and displaying an error correction screen including a text reading result to be corrected in the field and the image of the field.

SUMMARY

Aspects of non-limiting embodiments of the present disclosure relate to an information processing apparatus, a non-transitory computer readable medium storing a program, and an information processing method that specify a position of an image corresponding to a corrected text string.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to acquire a text recognition result including a text string included in an image and position information of the text string in the image, display the text string included in the text recognition result, and specify, in a case where the displayed text string is corrected, position information corresponding to the corrected text string, among pieces of the position information associated with each text string included in the text recognition result.

BRIEF DESCRIPTION OF THE DRAWINGS

Exemplary embodiment(s) of the present invention will be described in detail based on the following figures, wherein.

DETAILED DESCRIPTION

CONFIGURATION

Figure 1:
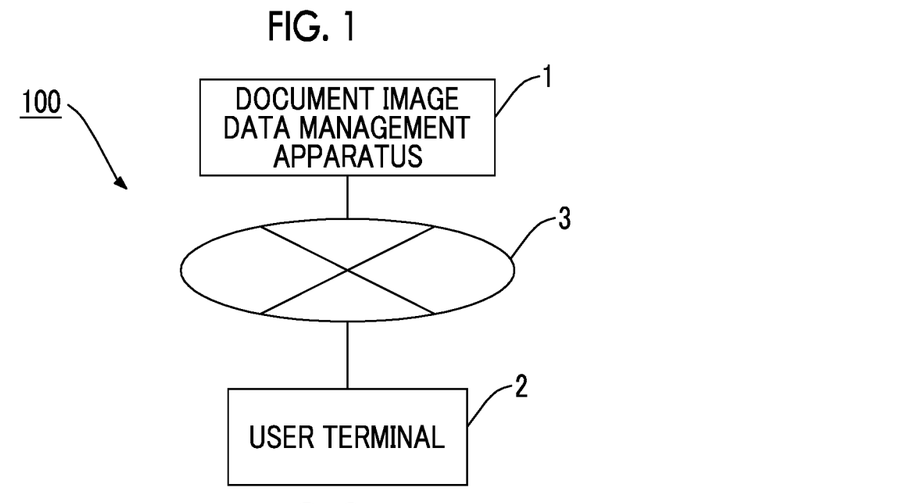
FIG. 1 is a block diagram illustrating a configuration of an information processing system according to an exemplary embodiment of the present invention.

FIG. 1 is a block diagram illustrating a configuration of an information processing system 100 according to the present exemplary embodiment. The information processing system 100 includes a document image data management apparatus 1 and a user terminal 2. Both the document image data management apparatus 1 and the user terminal 2 are computer apparatuses, and are connected to each other by a communication line 3 including a wireless communication line or a wired communication line. The document image data management apparatus 1 is an example of an information processing apparatus according to an exemplary embodiment of the invention.

Figure 2:
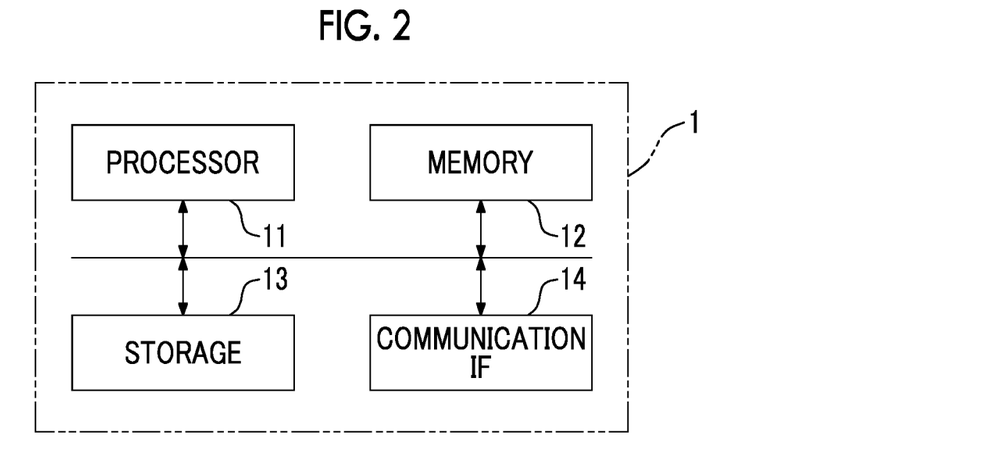
FIG. 2 is a block diagram illustrating a hardware configuration of a document image data management apparatus according to the present exemplary embodiment.

FIG. 2 is a diagram illustrating a hardware configuration of the document image data management apparatus 1. A processor 11 is a processor that controls other components of the document image data management apparatus 1. A memory 12 is a storage device that functions as a work area which is used in a case where the processor 11 executes a program, and includes, for example, a random access memory (RAM). The storage 13 is a storage device that stores various programs and data, and includes, for example, a solid state drive (SSD) or a hard disk drive (HDD). The processor 11 executes a program stored in the memory 12 or the storage 13, and thus functions of the document image data management apparatus 1 are realized. A communication interface (IF) 14 performs communication with another apparatus via the communication line 3 according to a predetermined wireless communication standard or a predetermined wired communication standard.

Figure 3:
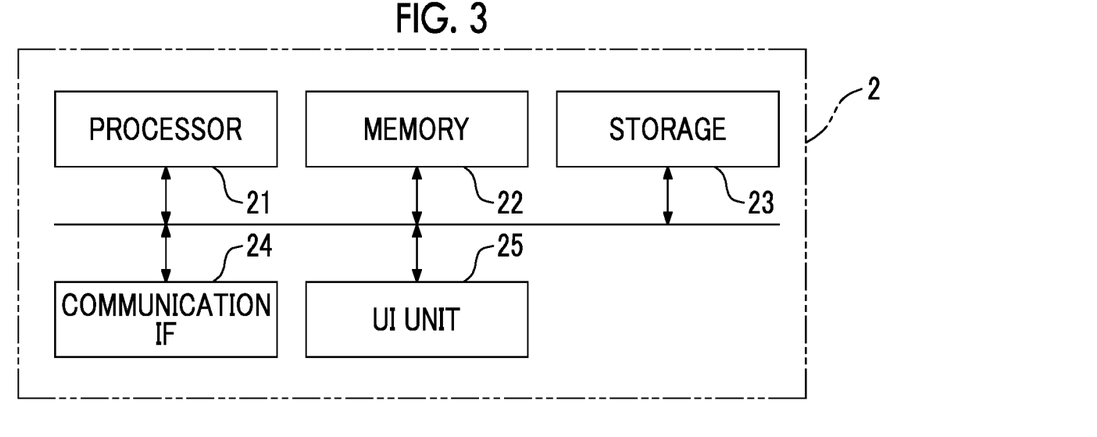
FIG. 3 is a block diagram illustrating a hardware configuration of a user terminal according to the present exemplary embodiment.

FIG. 3 is a diagram illustrating a hardware configuration of the user terminal 2. A processor 21 is a processor that controls other components of the user terminal 2. A memory 22 is a storage device that functions as a work area which is used in a case where the processor 21 executes a program, and includes, for example, a RAM. A storage 23 is a storage device that stores various programs and data, and includes, for example, an SSD or an HDD. The processor 21 executes a program stored in the memory 22 or the storage 23, and thus functions of the user terminal 2 are realized. A communication IF 24 performs communication with another apparatus according to a predetermined wireless communication standard or a predetermined wired communication standard. A user interface (UI) unit 25 includes, for example, a display device such as a display, and an operation device such as various keys, and displays a UI screen for a user and receives an operation of a user.

In the information processing system 100, in a case where a scanner apparatus (not illustrated) is caused to read a document by a user, document image data indicating the read result is generated by the scanner apparatus, and the document image data is stored in the document image data management apparatus 1. The user can browse various document image data stored in the document image data management apparatus 1, or assign, as information called as a tag or meta data, any text string to the document image data, by operating the user terminal 2.

Figure 4:
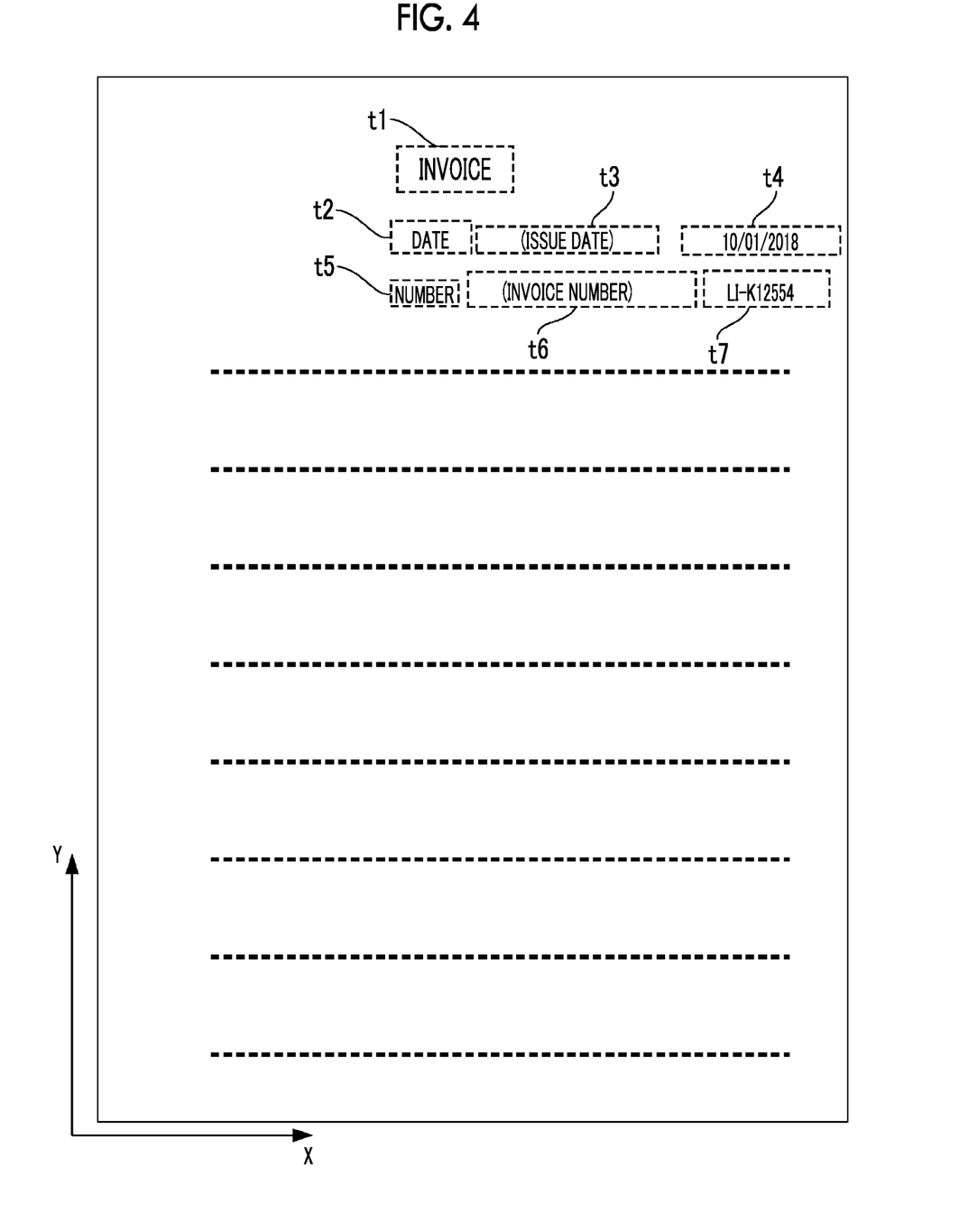
FIG. 4 is a diagram illustrating a document.

FIG. 4 is a diagram illustrating a document according to the present exemplary embodiment. This example illustrates a situation where a document corresponding to an invoice includes text strings t1 to t7 corresponding to "INVOICE", "DATE", "NUMBER", and the like.

Figure 5:
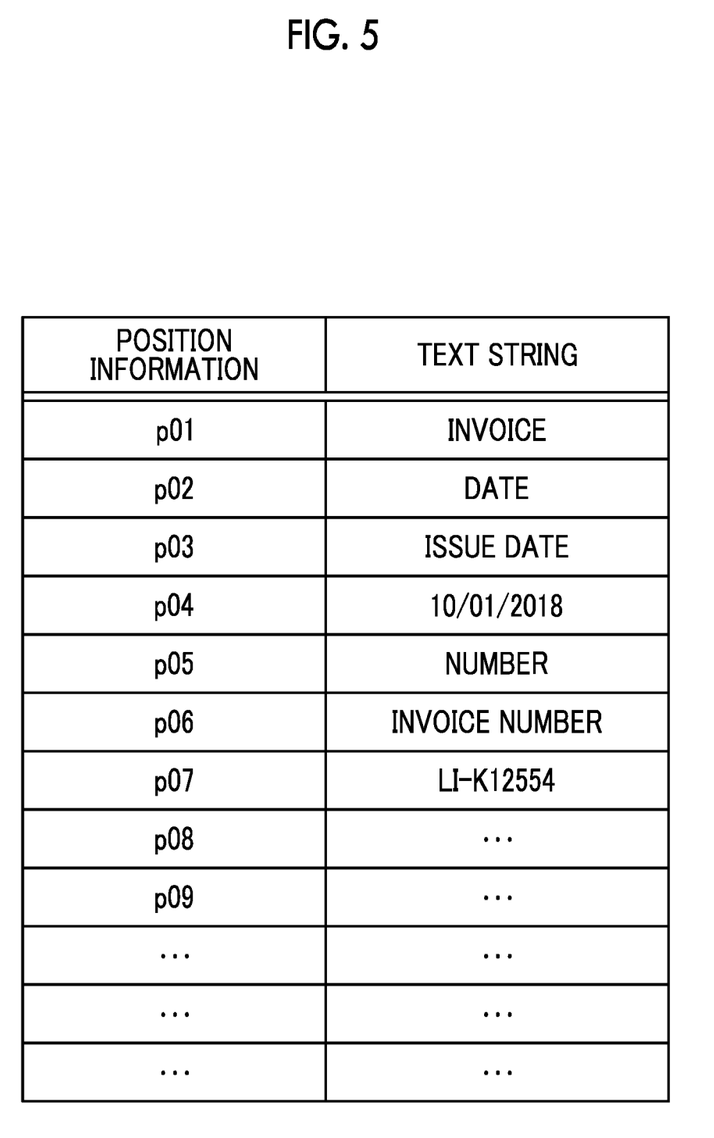
FIG. 5 is a diagram illustrating a text recognition result stored in the document image data management apparatus.

The processor 11 of the document image data management apparatus 1 performs text recognition processing such as optical character recognition/reader (OCR) on document image data indicating a document. Thereby, the processor 11 acquires a text recognition result including a text string included in the document image data and a position of the text string in the document image data. The text recognition result is stored in the storage 13 of the document image data management apparatus 1. FIG. 5 is a diagram illustrating a text recognition result stored in the storage 13 of the document image data management apparatus 1. FIG. 5 illustrates a result obtained by performing text recognition processing on the document illustrated in FIG. 4. As illustrated in FIG. 5, a group of text strings recognized by performing the text recognition processing and a group of pieces of position information indicating a position of each text string in the document are stored in association with each other. Each position information corresponding to each text string is represented by, for example, an XY coordinate value (x, y) of any one vertex of a rectangle including the text string (for example, a circumscribed rectangle circumscribing the text string), a length (width) of the rectangle in an X-axis direction, and a length (height) of the rectangle in a Y-axis direction, based on XY orthogonal coordinate axes which are set for the document (refer to FIG. 4). For example, in FIG. 4, the position information of the text string t1 "INVOICE" is "p01" as illustrated in FIG. 5, and the position information of the text string t2 "DATE" is "p02" as illustrated in FIG. 5. Further, the position information of the text string t3 "ISSUE DATE" is "p03" as illustrated in FIG. 5, and the position information of the text string t4 "10/01/2018" is "p04" as illustrated in FIG. 5.

The processor 11 of the document image data management apparatus 1 extracts text strings called as a key and a value from the group of the recognized text strings, and extracts image data corresponding to the text string called as a value from the document image data. Here, the key means an attribute of a text string that is predetermined from the group of the text strings included in each document, such as a title of the document, a date of the document, and a reference number of the document. On the other hand, the value is the text string itself corresponding to the key in each document, and the key and the value are paired concepts. For example, in the document corresponding to the invoice, the value corresponding to the key "TITLE" is the text string "INVOICE", and the value corresponding to the key "DATE" is the text string "MM/DD/YYYY" (M, D, and Y are any numbers), and the value corresponding to the key "NUMBER" is the text string "XXXXXXXXX" (X is any text, symbol or number). The text string corresponding to the key according to the present exemplary embodiment is an example of a first text string according to an exemplary embodiment of the present invention, and the text string corresponding to the value according to the present exemplary embodiment is an example of a second text string according to an exemplary embodiment of the present invention.

Figure 6:
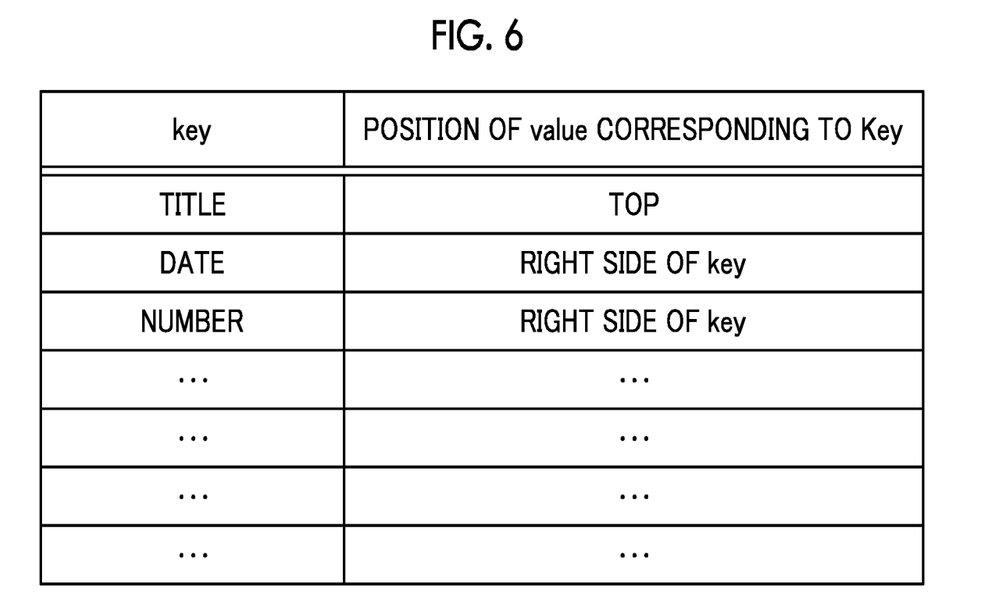
FIG. 6 is a diagram illustrating an extraction table stored in the document image data management apparatus.

The processor 11 of the document image data management apparatus 1 stores an extraction table in which rules for extracting the keys and the values from the document image data are described. FIG. 6 is a diagram illustrating an extraction table stored in the storage 13 of the document image data management apparatus 1. In the extraction table, the group of the text strings serving as each key in the document and the pieces of the position information of the text strings serving as the value corresponding to each key are associated with each other. In the extraction table, for example, it is defined that the value corresponding to the key "TITLE" is at a position "TOP" in the document. In addition, it is defined that the value corresponding to the key "DATE" is at a position "RIGHT SIDE OF key" in the document. Further, it is defined that the value corresponding to the key "NUMBER" is at a position "RIGHT SIDE OF key" in the document. In FIG. 6, the position information of the text string that serves the value corresponding to each key is represented as "TOP" or "RIGHT SIDE". On the other hand, in reality, the position information is represented using, for example, a coordinate value in an XY orthogonal coordinate system which is set for the document. For example, the top position means, for example, the position information of the text string having the largest Y coordinate value on the XY orthogonal coordinate axes which are set for the document. Further, the position on the right side of the key means, for example, the position information of the text string having an X coordinate value which is next larger than an X coordinate value of the key on the XY orthogonal coordinate axes which are set for the document.

Figure 7:
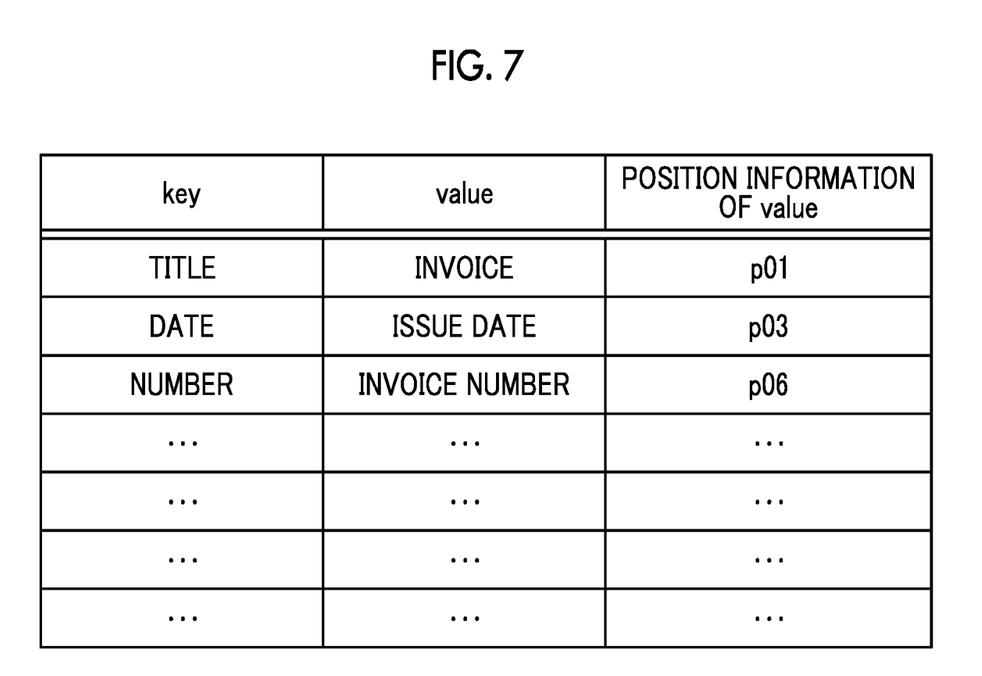
FIG. 7 is a diagram illustrating an extraction result stored in the document image data management apparatus.

The processor 11 of the document image data management apparatus 1 extracts text strings called as a key and a value from the group of the recognized text strings according to the extraction table, and extracts image data corresponding to the text string called as a value from the document image data. FIG. 7 is a diagram illustrating an extraction result stored in the storage 13 of the document image data management apparatus 1. FIG. 7 illustrates an extraction result, from the document illustrated in FIG. 4, according to the extraction table illustrated in FIG. 6. As illustrated in FIG. 7, the text string as the value "INVOICE" corresponding to the key "TITLE" is extracted, and the position information "p01" of the image data corresponding to the value "INVOICE" is extracted. In addition, the text string as the value "ISSUE DATE" corresponding to the key "DATE" is extracted, and the position information "p03" of the image data corresponding to the value "ISSUE DATE" is extracted. Further, the text string as the value "INVOICE NUMBER" corresponding to the key "NUMBER" is extracted, and the position information "p06" of the image data corresponding to the value "INVOICE NUMBER" is extracted. Here, extraction of the position information of the image data corresponding to the value corresponds to extraction of the image data.

In FIG. 7, the text string "ISSUE DATE" is extracted as the value corresponding to the key "DATE". On the other hand, the text string is only an English translation of a word "DATE", and the value is a text string "MM/DD/YYYY" (M, D, and Y are any numbers), which is the value corresponding to the key "DATE", that is, "10/01/2018". Similarly, the text string "INVOICE NUMBER" is extracted as the value corresponding to the key "NUMBER". On the other hand, the text string is only an English translation of a word "NUMBER", and the value is a text string "LI-K12554". Such an error occurs, for example, because there may be cases where layouts are different in various documents, such as a case where the value corresponding to the key "DATE" is on the right side of the key, or as illustrated in the example of FIG. 4, a case where the value corresponding to the key "DATE" is on the right side of the English translation of the key.

In such a case, the user may correct the extraction result by operating the user terminal 2. An operation related to the correction will be described.

OPERATION

Figure 8:
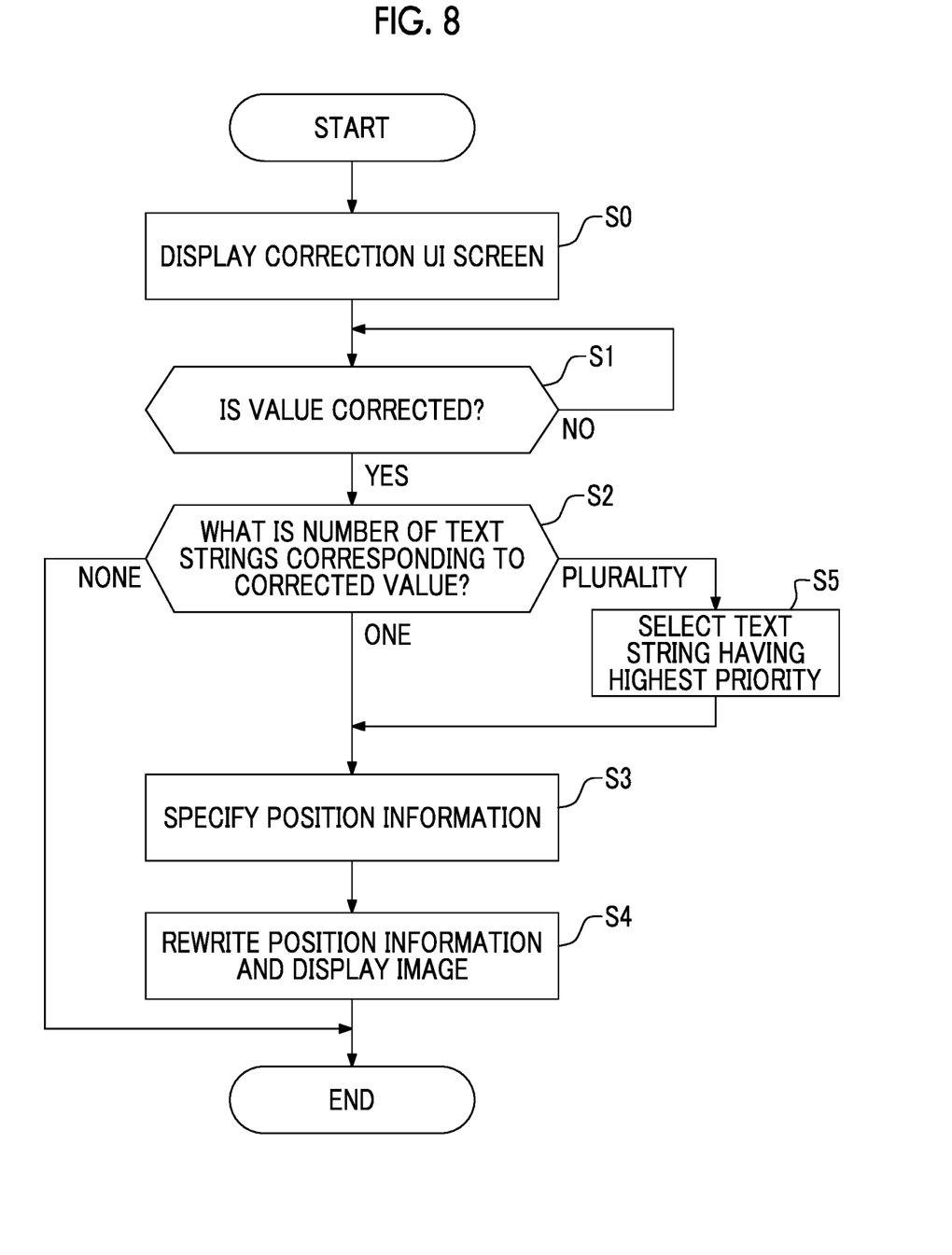
FIG. 8 is a flowchart illustrating an operation of the document image data management apparatus.
Figure 9:
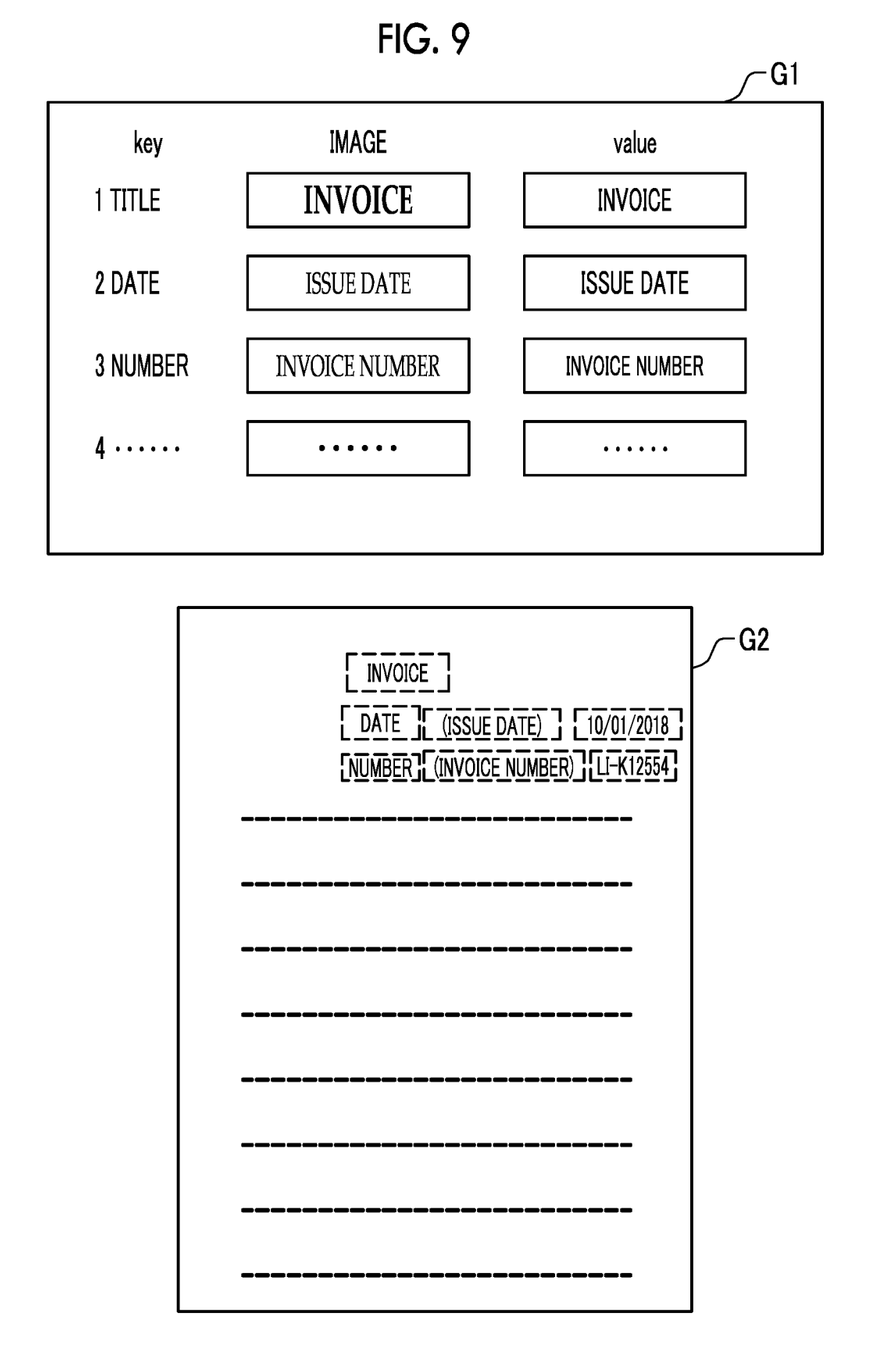
FIG. 9 is a diagram illustrating a correction UI screen displayed on the user terminal.

An operation of the document image data management apparatus 1 will be described with reference to a flowchart illustrated in FIG. 8. In FIG. 8, the processor of the document image data management apparatus 1 causes the user terminal 2 to display a correction UI screen for allowing the user to correct the extraction result (step S0). FIG. 9 is a diagram illustrating a correction UI screen. A correction UI screen G1 illustrated in FIG. 9 is, for example, a UI screen according to the contents of FIG. 7. On the correction UI screen, a text string corresponding to the key included in the text recognition result, a text string corresponding to the value included in the text recognition result, and an image which corresponds to the text string corresponding to the value and is included in the image represented by the document image data are displayed. Further, a correction UI screen G2 illustrated in FIG. 9 is a UI screen on which the entire document image represented by the document image data illustrated in FIG. 4 is displayed. The correction UI screens G1 and G2 are displayed side by side on one screen, for example, such that the screens are browsed at the same time by the user.

Here, as described above, the text string "ISSUE DATE" is displayed as the value corresponding to the key "DATE", and the image corresponding to the value is displayed. On the other hand, the value is originally "10/01/2018". For this reason, the user performs an operation of correcting "ISSUE DATE" displayed as the value corresponding to the key "DATE" to "10/01/2018". The correction operation may be, for example, an operation in which the user directly inputs the text string "10/01/2018" as the value corresponding to the key "DATE" on the correction UI screen G1, or may be an operation in which the user designates the text string "10/01/2018" displayed on the correction UI screen G2 as the value corresponding to the key "DATE".

In a case where it is determined that the value is corrected (YES in step S1), the processor 11 of the document image data management apparatus 1 searches for a text string corresponding to "10/01/2018" as the corrected value from the text recognition result illustrated in FIG. 5, and determines the number of the text strings corresponding to the corrected value (step S2). Here, in a case where the text recognition result does not include a text string corresponding to the corrected value (NONE in step S2), the processor 11 of the document image data management apparatus 1 causes the user terminal 2 to display a predetermined error screen, and ends processing illustrated in FIG. 8.

In a case where the text recognition result includes one text string corresponding to the corrected value (ONE in step S2), the processor 11 of the document image data management apparatus 1 specifies the position information of the image corresponding to the text string, based on the text recognition result illustrated in FIG. 5 (step S3). Here, as illustrated in FIG. 5, the position information "p04" corresponding to the text string "10/01/2018" is specified.

Figure 10:
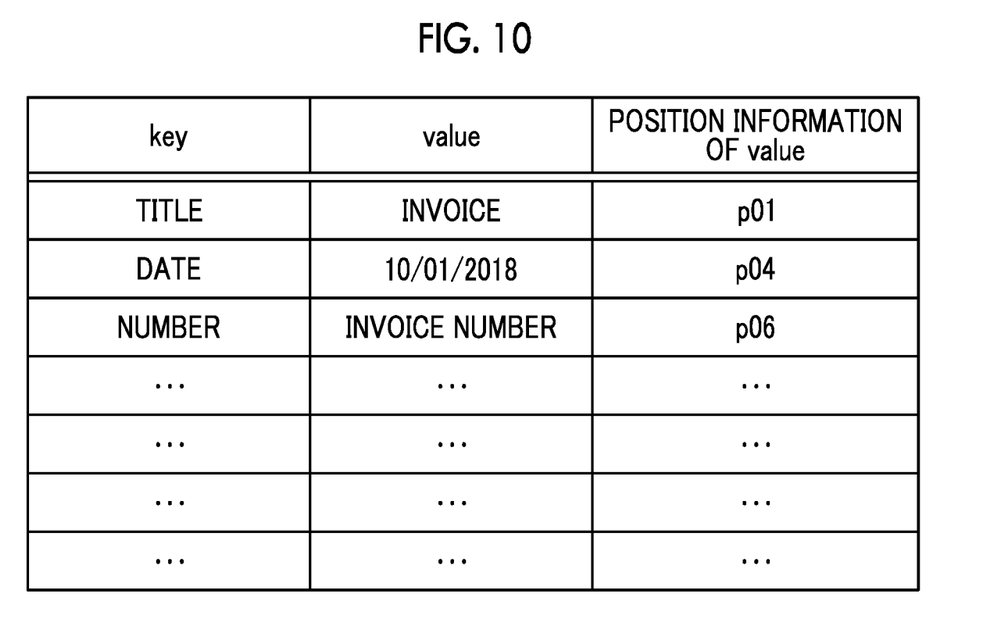
FIG. 10 is a diagram illustrating a correction example of an extraction result stored in the document image data management apparatus.
Figure 11:
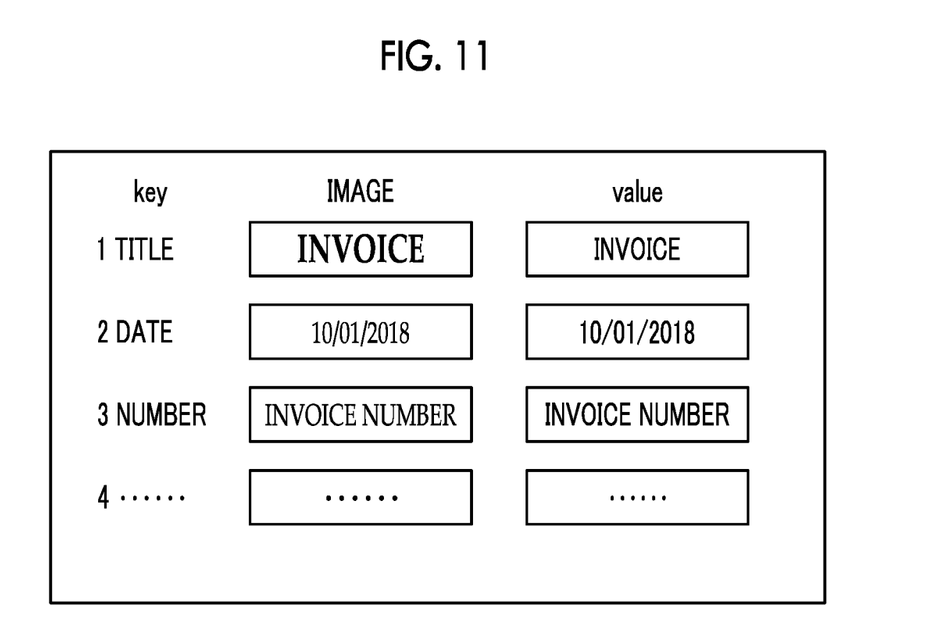
FIG. 11 is a diagram illustrating a correction UI screen displayed on the user terminal.

The processor 11 of the document image data management apparatus 1 rewrites the text string "ISSUE DATE" which is the value before correction, corresponds to the key "DATE", and is included in the data illustrated in FIG. 7, into the text string "10/01/2018" as the corrected value, and rewrites the corresponding position information "p03" into the specified position information "p04" (step S4). Thereby, the content of the extraction result illustrated in FIG. 7 can be rewritten into an extraction result as illustrated in FIG. 10. Therefore, as illustrated in FIG. 11, on the correction UI screen G1, the value "10/01/2018" corresponding to the key "DATE" is displayed, and the image corresponding to the position information "p04" (in the document image, the image corresponding to "10/01/2018") is displayed.

Figure 12:
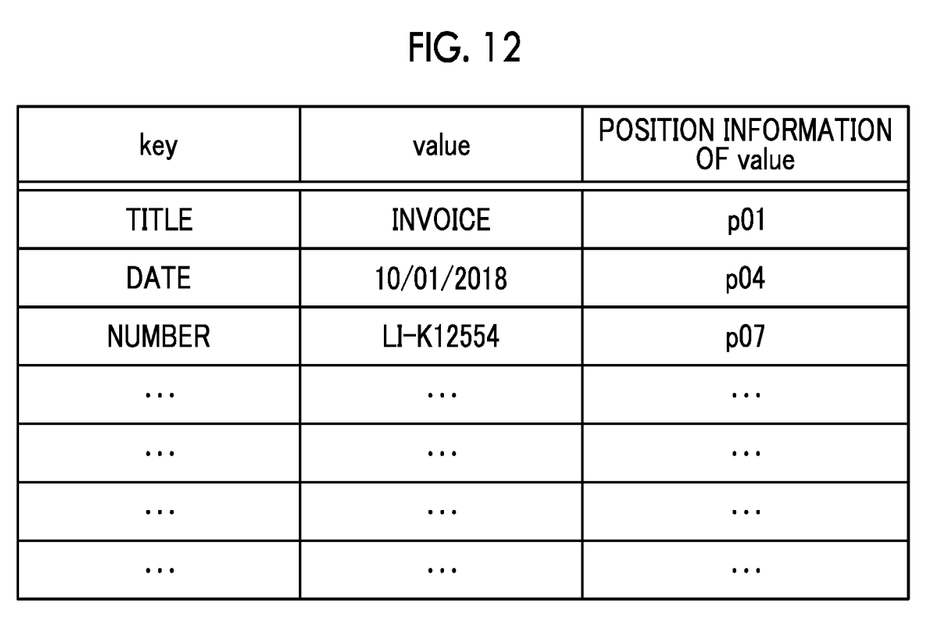
FIG. 12 is a diagram illustrating a correction example of an extraction result stored in the document image data management apparatus.
Figure 13:
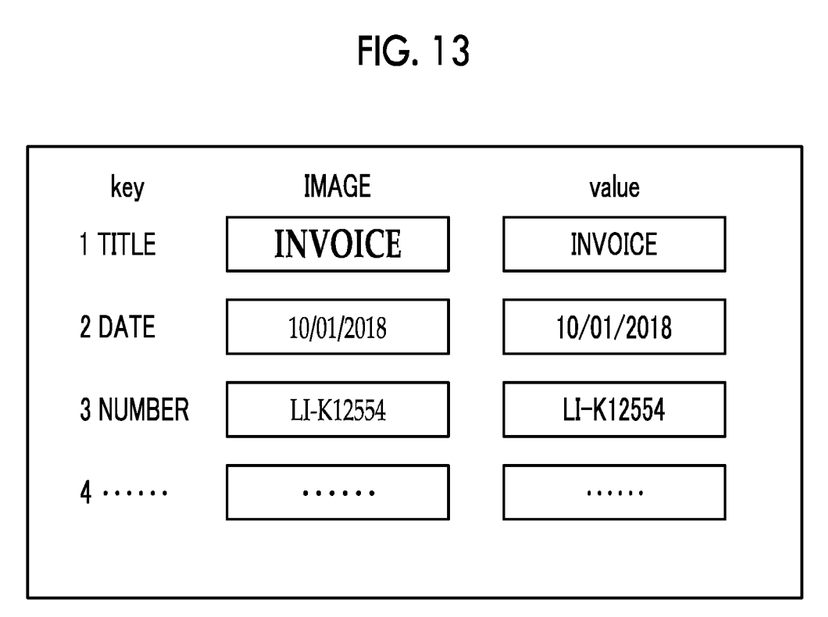
FIG. 13 is a diagram illustrating a correction UI screen displayed on the user terminal.

In the same procedure, in a case where the user corrects "INVOICE NUMBER" displayed as the value corresponding to the key "NUMBER", to "LI-K12554", as illustrated in FIG. 12, the processor 11 of the document image data management apparatus 1 rewrites the text string "INVOICE NUMBER", which is the value before correction, corresponds to the key "NUMBER", and is included in the data illustrated in FIG. 7, into the text string "LI-K12554" as the corrected value, and rewrites the corresponding position information "p06" into the position information "p07". Thereby, the correction UI screen G1 as illustrated in FIG. 13 is displayed on the user terminal 2.

Further, in a case where the text recognition result includes a plurality of text strings corresponding to the corrected value (plurality in step S2), the processor 11 of the document image data management apparatus 1 selects the text string having the highest priority based on priorities in the text recognition result illustrated in FIG. 5 (step S5).

Specifically, the processor 11 of the document image data management apparatus 1 causes the user terminal 2 to display, on the correction UI screen G2, a plurality of images at positions indicated by pieces of the position information of the plurality of text strings corresponding to the values according to the example of FIG. 6, and in a case where the user selects an image from the plurality of images by operating the user terminal 2, causes the user terminal 2 to display, as the image corresponding to the corrected text string, the image selected by the user. After correction, as described above, the extraction result of the text string is rewritten, and the correction UI screen G1 according to the rewritten extraction result is displayed.

According to the above-described present exemplary embodiment, it is possible to specify the position of the image corresponding to the corrected text string, from the group of the text strings included in the document. Further, according to the present exemplary embodiment, it is possible to display an image at a specified position.

MODIFICATION EXAMPLE

The above-described exemplary embodiment is merely an example of implementation of the present invention, and may be modified as follows. Further, the above-described exemplary embodiment and each of the following modification examples may be implemented by being combined with each other as appropriate.

(1) In the above-described exemplary embodiment, the processor 11 of the document image data management apparatus 1 causes the user terminal 2 to display the text string (second text string) corresponding to the value, which corresponds to the text string (first text string) corresponding to the key detected from the text recognition result, and in a case where the text string (second text string) corresponding to the value is corrected, specifies the position information corresponding to the text string (second text string), which corresponds to the corrected value, from the group of pieces of position information associated with each text string included in the text recognition result. On the other hand, the text string (first text string) corresponding to the key may be corrected by the user. In this case, in a case where the first text string is corrected, the processor 11 may specify the position information corresponding to the corrected first text string, from the group of pieces of position information associated with each text string included in the text recognition result, and cause the user terminal 2 to display the image at the specified position.

(2) In the above-described exemplary embodiment, in a case where the text string corresponding to the value is corrected and the corrected text string and the text string included in the text recognition result match with each other, the processor 11 of the document image data management apparatus 1 specifies the position information of the matched text string, and causes the user terminal 2 to display the image at the specified position. In the processing, in a case where the text string corresponding to the value is corrected and a part of the corrected text string and each text string included in the text recognition result match with each other, the processor 11 may specify the position information of the corrected text string including the matched part, and cause the user terminal 2 to display the image at the specified position. That is, the corrected text string and the text string included in the text recognition result may partially match with each other.

(3) In the above-described exemplary embodiment, in a case where the text string corresponding to the value is corrected and a plurality of pieces of position information corresponding to the corrected text string are specified from the group of pieces of position information associated with each text string included in the text recognition result, the processor 11 of the document image data management apparatus 1 treats the position information of the image selected by the user, as the position information having the highest priority. On the other hand, the priority is not limited to the example of the exemplary embodiment.

Further, the processor 11 may store a plurality of rules for specifying the priority in the storage 13, and use any one of the plurality of rules. For example, the processor 11 may use, among the plurality of rules, a rule according to the corrected text string. For example, in a case where the corrected text string is the text string corresponding to the value which corresponds to the key "TITLE", the processor 11 may set the priority of the text string having the largest size or the text string having a specific font to be higher.

Further, the processor 11 may use, among the plurality of rules, a rule according to an attribute of the document image data. For example, a case where metadata indicating a type (attribute) is assigned to the document image data is considered. For example, in a case where certain metadata A is assigned to the document image data and the corrected text string is the text string corresponding to the value which corresponds to the key "TITLE", the processor 11 may set the priority of the text string having the largest size to be higher. Further, for example, in a case where certain metadata B is assigned to the document image data and the corrected text string is the text string corresponding to the value which corresponds to the key "TITLE", the processor 11 may set the priority of the text string having a specific font to be higher.

(4) In a case where the text string is corrected, the processor 11 of the document image data management apparatus 1 may cause the user terminal 2 to display a UI screen for setting whether or not the image corresponding to the corrected text string is to be recognized as a text. For example, in a case where the text string is corrected, the processor 11 of the document image data management apparatus 1 may cause the user terminal 2 to display a screen for designating the position of the image to be recognized as a text. More specifically, the processor 11 causes the user terminal 2 to display a screen for inquiring of the user about whether to rewrite the position information of the text string as the value corresponding to each key, which is illustrated in FIG. 6, into the position information indicating the position of the image which corresponds to the corrected text string and is included in the document, and in a case where a response for rewriting is input from the user, rewrites the position information of the text string into the position information indicating the position of the image which corresponds to the corrected text string and is included in the document. Thereby, the position information of the text string, such as "TOP" or "RIGHT SIDE" illustrated in FIG. 6, is rewritten. Therefore, the user does not need to correct the text string after the rewriting.

(5) In the above-described exemplary embodiment, the program executed by the processor 11 of the document image data management apparatus 1 or the program executed by the processor 21 of the user terminal 2 may be downloaded via a communication line such as the Internet. Further, the program may be provided by being recorded on a computer-readable recording medium such as a magnetic recording medium (a magnetic tape, a magnetic disk, or the like), an optical recording medium (an optical disk or the like), a magneto-optical recording medium, or a semiconductor memory.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
acquire a text recognition result including a text string included in an image and position information of the text string in the image;
display the text string included in the text recognition result;
specify, in a case where the displayed text string is corrected, position information corresponding to the corrected text string, among pieces of the position information associated with each text string included in the text recognition result;
acquire image data representing an image; and
specify, in a case where the displayed text string is corrected and a plurality of pieces of position information corresponding to the corrected text string are specified from a group of pieces of the position information associated with each text string included in the text recognition result, a priority for each of a plurality of images at positions indicated by the plurality of pieces of position information, and
display, as an image corresponding to the corrected text string, an image that is selected according to the specified priority from the plurality of images.

2. The information processing apparatus according to claim 1, wherein the processor is configured to:
display a second text string corresponding to a first text string included in the text recognition result, and
specify, in a case where the second text string is corrected, position information corresponding to the corrected second text string, among pieces of the position information associated with each text string included in the text recognition result.

3. The information processing apparatus according to claim 2, wherein the processor is configured to:
specify, in a case where the first text string is corrected, position information corresponding to the corrected first text string from a group of pieces of the position information associated with each text string included in the text recognition result.

4. The information processing apparatus according to claim 3, wherein the processor is configured to:
display, among images represented by the acquired image data, an image at a position indicated by the specified position information.

5. The information processing apparatus according to claim 4, wherein the processor is configured to:
display, among the images represented by the acquired image data, an image including the corrected text string.

6. The information processing apparatus according to claim 2, wherein the processor is configured to:
display, among images represented by the acquired image data, an image at a position indicated by the specified position information.

7. The information processing apparatus according to claim 6, wherein the processor is configured to:
display, among the images represented by the acquired image data, an image including the corrected text string.

8. The information processing apparatus according to claim 2, wherein the processor is configured to:
specify, in a case where the text string is corrected and a part of the corrected text string and each text string included in the text recognition result match with each other, position information of the corrected text string including the matched part.

9. The information processing apparatus according to claim 1, wherein the processor is configured to:
display, among images represented by the acquired image data, an image at a position indicated by the specified position information.

10. The information processing apparatus according to claim 9, wherein the processor is configured to:
display, among the images represented by the acquired image data, an image including the corrected text string.

11. The information processing apparatus according to claim 1, wherein the processor is configured to:
specify, in a case where the text string is corrected and a part of the corrected text string and each text string included in the text recognition result match with each other, position information of the corrected text string including the matched part.

12. The information processing apparatus according to claim 1, wherein the processor is configured to:
display, in a case where the text string is corrected and the plurality of pieces of position information corresponding to the corrected text string are specified from the group of pieces of the position information associated with each text string included in the text recognition result, a plurality of images at positions indicated by the plurality of pieces of position information, and
display, as an image corresponding to the corrected text string, an image selected from the plurality of images.

13. The information processing apparatus according to claim 1, wherein the processor is configured to:
use one of a plurality of rules for specifying the priority.

14. The information processing apparatus according to claim 13, wherein the processor is configured to:
use, among the plurality of rules, a rule according to the corrected text string.

15. The information processing apparatus according to claim 13, wherein the processor is configured to:
use, among the plurality of rules, a rule according to an attribute of the image data.

16. The information processing apparatus according to claim 1, wherein the processor is configured to:
display, in a case where the text string is corrected, a screen for setting whether or not the image corresponding to the corrected text string is to be recognized as a text.

17. The information processing apparatus according to claim 16, wherein the processor is configured to:
display a screen for designating a position of the image to be recognized as a text.

18. A non-transitory computer readable medium storing a program causing a computer to execute a process comprising:
acquiring a text recognition result including a text string included in an image and a position of the text string in the image;
displaying the text string included in the text recognition result;
specifying, in a case where the text string is corrected, position information corresponding to the corrected text string from a group of pieces of the position information associated with each text string included in the text recognition result;
acquiring image data representing an image; and specifying, in a case where the displayed text string is corrected and a plurality of pieces of position information corresponding to the corrected text string are specified from a group of pieces of the position information associated with each text string included in the text recognition result, a priority for each of a plurality of images at positions indicated by the plurality of pieces of position information, and displaying, as an image corresponding to the corrected text string, an image that is selected according to the specified priority from the plurality of images.

19. An information processing method comprising:

acquiring a text recognition result including a text string included in an image and position information of the text string in the image;

displaying the text string included in the text recognition result;

specifying, in a case where the displayed text string is corrected, position information corresponding to the corrected text string, among pieces of the position information associated with each text string included in the text recognition result;

acquiring image data representing an image;

specifying, in a case where the displayed text string is corrected and a plurality of pieces of position information corresponding to the corrected text string are specified from a group of pieces of the position information associated with each text string included in the text recognition result, a priority for each of a plurality of images at positions indicated by the plurality of pieces of position information; and displaying, as an image corresponding to the corrected text string, an image that is selected according to the specified priority from the plurality of images.

* * * * *